J. C. EDWARDS.
Main-Springs.

No. 156,480.          Patented Nov. 3, 1874.

UNITED STATES PATENT OFFICE.

JAMES C. EDWARDS, OF BINGHAMTON, NEW YORK.

IMPROVEMENT IN MAINSPRINGS.

Specification forming part of Letters Patent No. 156,480, dated November 3, 1874; application filed July 25, 1874.

*To all whom it may concern:*

Be it known that I, JAMES C. EDWARDS, of Binghamton, Broome county, New York, have invented a new and useful Improvement in Mainspring Attachments, of which the following is a specification:

My invention consists of the mainspring of a watch, clock, or other spring-power, having the hole which receives the stud-pin in the face of the barrel, arbor, or hub, for attaching it thereto, placed the distance of one circumference of the barrel or arbor, or thereabout, from the end, and tapered from the hole to the end, to graduate the rise of the next coil of the spring from the face of the barrel or hub onto the spring, so as to entirely avoid the abrupt projection which the end of the spring forms when left the full thickness, and which produces an extra strain and bend at that point, which weakens the spring, so as to cause it to break in a little while, and, besides, it causes an irregular action of the spring.

Figure 1:
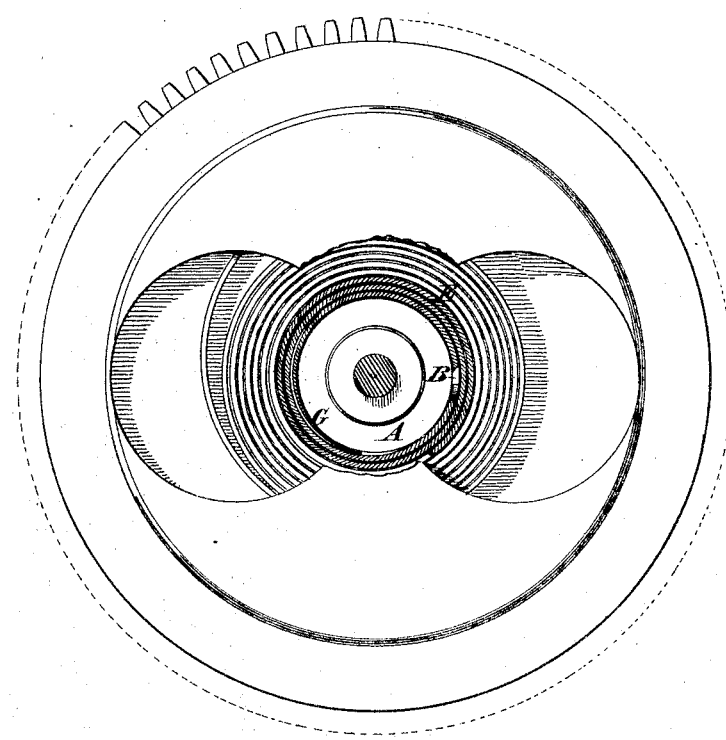
Figure 2:

Figure 1 is a horizontal section of the hub and a part of the mainspring, showing my improved mode of connecting the spring; and Fig. 2 is a section of a portion of the spring.

Similar letters of reference indicate corresponding parts.

A is the hub or arbor to which the spring is to be attached. B is the stud-pin projecting from the face of the arbor. E is the spring; F, the hole in the spring, for hooking it into the stud-pin; and G is the tapering prolongation of the spring beyond the hole for the stud-pin, to graduate the rise of the first coil from the stud-pin from the face of the hub onto the spring, so as not to make an abrupt bend.

Having thus described my invention, I claim as new and desire to secure by Letters Patent—

The prolongation G of a coiled spring beyond the hole for the stud-pin of the arbor, one coil or part of a coil around the hub or arbor, and said prolongation tapered gradually to a point, substantially as specified.

JAMES C. EDWARDS.

Witnesses:
E. P. REYNOLDS,
J. HUNGERFORD.